United States Patent
Macke et al.

(10) Patent No.: US 7,543,689 B2
(45) Date of Patent: Jun. 9, 2009

(54) DISC BRAKE FOR UTILITY VEHICLES

(75) Inventors: Wlodzimierz Macke, Olching (DE); Robert Gruber, Olching (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 241 days.

(21) Appl. No.: 10/549,690

(22) PCT Filed: Mar. 18, 2004

(86) PCT No.: PCT/EP2004/002804

§ 371 (c)(1), (2), (4) Date: Sep. 7, 2006

(87) PCT Pub. No.: WO2004/083665

PCT Pub. Date: Sep. 30, 2004

(65) Prior Publication Data

US 2007/0029147 A1 Feb. 8, 2007

(30) Foreign Application Priority Data

Mar. 18, 2003 (DE) .................................. 103 11 896

(51) Int. Cl.
*F16D 65/14* (2006.01)
*F16D 55/04* (2006.01)

(52) U.S. Cl. .................................. 188/73.45; 188/73.1

(58) Field of Classification Search ............. 188/73.45, 188/73.44, 73.43, 73.42, 73.1, 73.37, 67, 188/18 A See application file for complete search history.

(56) References Cited

U.S. PATENT DOCUMENTS

| | | | | |
|---|---|---|---|---|
| 3,841,446 A | * | 10/1974 | Gravel, Jr. | 188/73.35 |
| 4,385,680 A | * | 5/1983 | DuCharme et al. | 188/72.4 |
| 5,012,902 A | * | 5/1991 | Moody et al. | 188/73.35 |
| 5,931,267 A | * | 8/1999 | Iwata et al. | 188/73.45 |
| 6,926,124 B2 | * | 8/2005 | Matsuzaki | 188/73.45 |

FOREIGN PATENT DOCUMENTS

| | | | | |
|---|---|---|---|---|
| JP | 52022665 A | * | 2/1977 | |
| JP | 55-054732 | | 4/1980 | |
| JP | 2001254767 A | * | 9/2001 | |
| WO | WO 03/025413 A1 | | 3/2003 | |

* cited by examiner

*Primary Examiner*—Melody M Burch
(74) *Attorney, Agent, or Firm*—Crowell & Moring LLP

(57) ABSTRACT

A disk brake, especially for a commercial vehicle, comprising a brake caliper (2) which is fixed on a brake carrier (3) of the commercial vehicle by means of two fixing elements such that it is axially displaceable in relation to the disk brake (1) whereby one fixing element is embodied as a fixed bearing (4) and the other fixing element is embodied as a loose bearing (5) with a sliding bushing (6) inserted into a bore of the brake caliper (2), whereby the inner or outer contour thereof deviates from that of a circle, whereby a guide bar (8), having for example a round cross-section, is guided in the sliding bushing (6). The sliding bushing (6) of the loose bearing (5) is provided with at least one securing element (10) which, when the sliding bushing (6) is mounted in a precise position, fixes the sliding bushing and is inserted into a recess (11) of the bore.

19 Claims, 3 Drawing Sheets

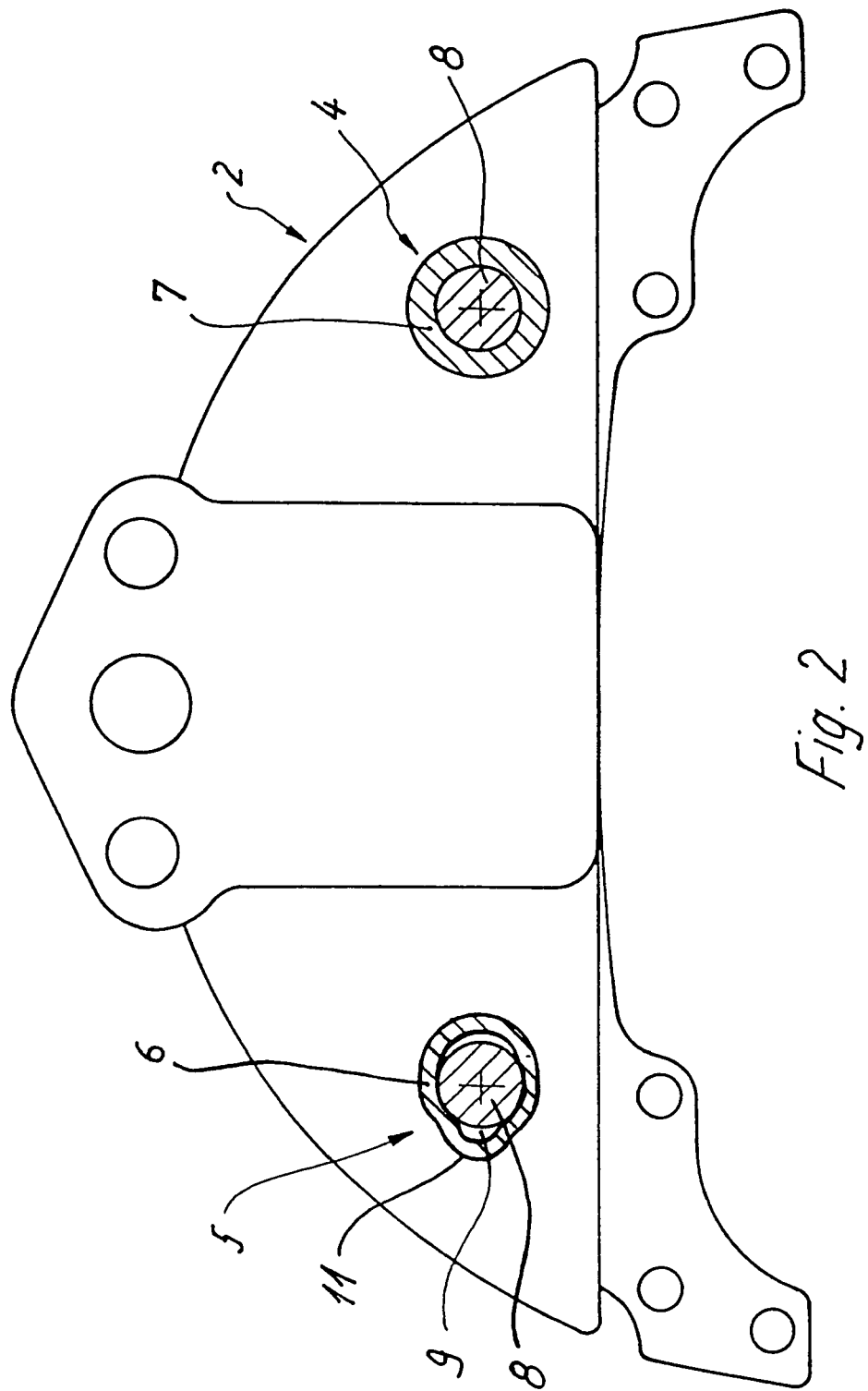

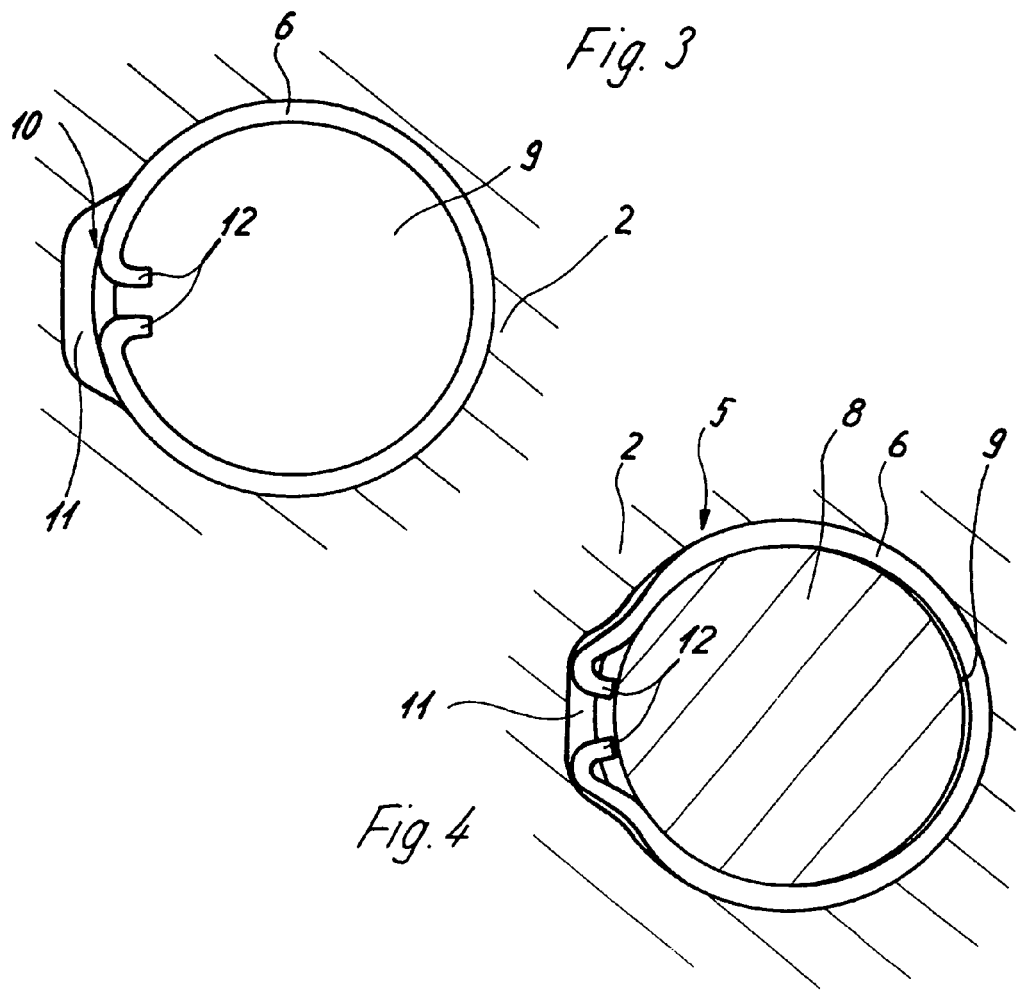
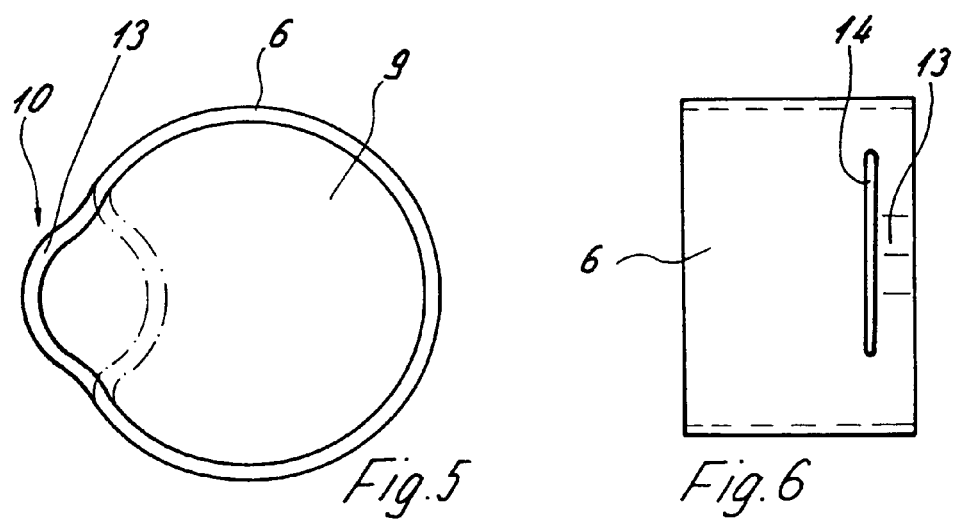

DISC BRAKE FOR UTILITY VEHICLES

BACKGROUND AND SUMMARY OF THE INVENTION

The present invention relates to a disc brake, in particular for a utility vehicle, having a brake caliper which surrounds a brake disc and is attached to a brake carrier of the utility vehicle so as to be axially displaceable with respect to the brake disc. Two attachment elements are typically used with one attachment element being embodied as a fixed bearing and the other being embodied as a loose bearing having a sliding bush inserted into a bore in the brake caliper. The internal contour and/or external contour of the bushing deviates from a circular shape and a guide bar which is, for example, round in cross section is guided in the sliding bush.

Accordingly, in such disc brakes, the brake caliper is connected by attachment elements to the brake carrier, which is fastened to the vehicle. At the same time, guide bars engage in the brake carrier and are, on the other hand, guided in sliding bearings of the brake caliper such that an axial displacement of the brake caliper with respect to the fixed brake carrier is possible. One of the sliding bearings is embodied as a fixed bearing with little sliding play, while the other functions as a loose bearing, as a result of which, in particular, fabrication tolerances are compensated.

In order to bring about such compensation it is known to provide the sliding bushing with a bore with, in the broadest sense, an oval cross section, in which case the greatest width of this bore extends transversely with respect to the axial direction so that the guide bar can migrate laterally in both directions with respect to the longitudinal center axis. As in the case of the fixed bearing, overall there is also no play or only a very small amount of play provided perpendicularly thereto.

However, for the sliding bushing to be fully operationally capable it is necessary for it to be positioned in a permanent and precise fashion, which includes both securing against axial displacement and securing against rotation.

In series fabrication of disc brakes, such precisely positioned securing is achieved, for example, by virtue of the fact that the sliding bushing is caulked to the brake caliper. It is also known to secure the sliding bushing in the brake caliper by using a form fit. Suitable tools which permit correspondingly precisely positioned insertion without difficulty are available for this for series fabrication.

In contrast, such precisely positioned mounting of the sliding bushing is not ensured when replacement is carried out for the purpose of repair so that, hitherto, incorrect positioning of the sliding bushing has readily occurred, which may lead to functional problems.

In all cases, the insertion of the sliding bushing into a predetermined position and its securing in this position have been able to be implemented only with considerable effort.

The invention is, therefore, based on developing a disc brake of the above-mentioned type in such a way that the sliding bushing may be introduced and secured permanently in any of its possible directions of movement using structurally simple mechanisms.

This is achieved by providing a disc brake, particularly for a commercial vehicle, having a brake caliper which surrounds a brake disc and is attached to a brake carrier of the utility vehicle so as to be axially displaceable with respect to the brake disc. Two attachment elements are typically used with one attachment element being embodied as a fixed bearing and the other being embodied as a loose bearing having a sliding bush inserted into a bore in the brake caliper. The internal contour and/or external contour of the bushing deviates from a circular shape and a guide bar which is, for example, round in cross section is guided in the sliding bush. The sliding bushing of the loose bearing is provided with at least one securing element which, when the sliding bushing is mounted in a precisely positioned fashion, is inserted into a recess of the bore such that it secures said sliding bush.

The inventive embodiment of the sliding bushing of the loose bearing of a disc brake ensures that, when it is completely assembled, the sliding bushing reliably assumes the correct predetermined position so that the functional capability of the loose bearing is ensured without limitation.

In this context, the securing element may be composed of at least one securing clip, which projects over the outer surface of the sliding bushing in the position of use of the loose bearing and is inserted into a recess of the bore in the brake caliper.

Before it corresponds to the recess of the bore, which may be embodied as a pocket, the securing clip projects into the inner bore of the sliding bushing and, as a result, closes off a free passage of the guide bar. When the guide bar is installed, the securing clip must therefore project into the recess of the bore in order to provide a free passage for the guide bar. In this way, virtually a double securement is provided for ensuring that when the sliding bushing is completely assembled it both assumes the predetermined position and remains secured in this position.

Especially for maintenance or repair work, this provision is particularly significant since incorrect installations are virtually ruled out.

In principle there may be any desired number of securing elements, i.e. of securing clips. The number of securing elements may be selected in accordance with the requirements for the necessary securing force.

Simple mounting is ensured by the lowest possible number of securing clips, preferably just one securing clip, while a plurality of securing clips is provided when there are large axial and/or rotational forces.

The shape of the securing clips may, in principle, also be selected freely. However, they must be shaped in such a way that they reliably prevent the guide bar from being pushed through, i.e. measure mounting, if the securing clips are not inserted into the recesses of the bore.

The securing clips and the recesses which are assigned to them, preferably in the form of pockets, are matched to one another in terms of shape and dimensions such that when they correspond to one another a large degree of positive locking is produced, which ensures that the sliding bushing is secured both circumferentially and axially.

Overall, this results not only in an advantage in terms of safety, but also a considerable advantage in terms of mounting since the installation of the sliding bushing may now be carried out significantly more easily and quickly. This is particularly the case when the sliding bushing is changed for maintenance reasons, for which the tools which are available during series mounting are neither available nor usable.

According to a further aspect of the invention, there is provision for the securing clips to be formed from the sliding bushing in an integral fashion. In such a case, as mentioned, the securing clips first project into the space formed by the inner bore and are then bent into the recess of the bore until they bear against the wall of the recess in such a way that the sliding bushing is prevented from moving in any direction. In this position, the guide bar, which is to be inserted, can be passed freely through the inner bore.

Further advantageous embodiments of the invention are described and claimed herein.

BRIEF DESCRIPTION OF THE DRAWINGS

Exemplary embodiments of the invention are described below with reference to the appended drawings, in which:

FIG. 2 shows a detail of the disc brake viewed in the direction II-II in FIG. 1;

FIG. 3 shows a sliding bushing of the disc brake in an incompletely mounted position in a plan view;

FIG. 4 shows the sliding bushing according to FIG. 3 in a completely mounted position, also in a plan view;

FIG. 5 shows a further exemplary embodiment of a sliding bushing in a plan view; and FIG. 6 shows the sliding bushing according to FIG. 5 in a side view.

DETAILED DESCRIPTION OF THE DRAWINGS

Figure 1:
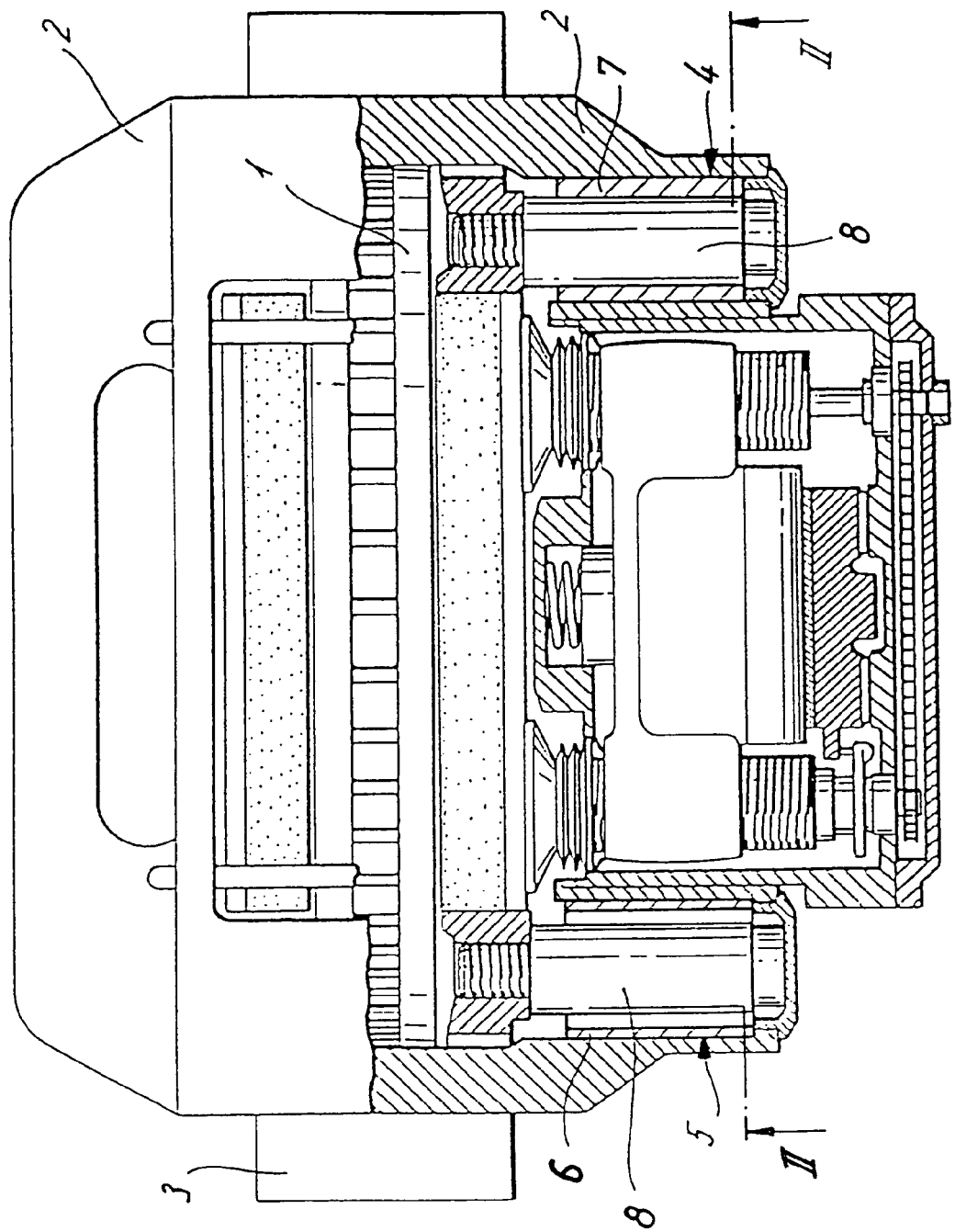
FIG. 1 is a partial longitudinal section view through a disc brake according to the invention.

FIG. 1 illustrates a disc brake, in particular for a utility vehicle, which has, in its basic design, a brake caliper 2 which extends over an internally vented brake disc 1. The brake disc 1 is attached to an axle (not illustrated) of the utility vehicle.

The brake caliper 2 is arranged on a brake carrier 3 of the utility vehicle so as to be axially displaceable with respect to the brake disc 1.

For this purpose, two attachment elements 4, 5 are provided, the attachment element 5 being embodied as a loose bearing and the attachment element 4 being embodied as a fixed bearing.

The two attachment elements 4, 5 each have a sliding bushing 6, 7 and a guide bar 8 which is guided therein, with the round sliding bushings 6, 7 being pressed into circumferentially round bores of the brake caliper 2.

The guide bars 8 are screwed into the brake carrier 3 and, thus, connected in a positionally fixed fashion with respect to the brake caliper 2, while the sliding bushings 6, 7 are permanently connected to the brake caliper 2 and are, therefore, mounted in an axially displaceable fashion on the bearing bolt 8 together with the brake caliper 2.

As is shown very clearly in particular by FIG. 2, the sliding bushing 6 of the loose bearing 5 has an inner bore 9 which differs in cross section from the circular shape, being approximately oval in the present exemplary embodiment, and whose greatest width extends in the plane on which the fixed bearing 4 is located.

The smallest dimension which is perpendicular with respect to the largest dimension of the inner bore 9 corresponds approximately to the diameter of the round guide bar 8. As a result, lateral play of the guide bar 8 with respect to the inner bore 9 is obtained.

In contrast, the sliding bushing 7 of the fixed bearing 4 is embodied as a cylindrical hollow element by virtue of the fact that the cylindrical guide bar 8 is guided with such little play that the sliding bushing 7, and thus the brake caliper 2, can be displaced axially in a satisfactory way.

As is also apparent from FIG. 2, but is particularly clear in FIGS. 3 and 4, the sliding bushing 6 of the loose bearing 5 has a securing element 10 which, when the sliding bushing 6 is mounted in a precisely positioned fashion, is inserted into a recess 11 of the bore of the brake caliper 2 and thus secures the sliding bushing 6 in both the axial and rotational directions.

In this context, the recess 11 is embodied in the shape of a pocket while the securing element 10 in the example shown in FIGS. 3 and 4 is embodied as two securing clips 12, which project in a hook shape into the inner bore 9 of the sliding bushing 6 before they are pressed into the recess 11.

The inner bore 9 is not released to such an extent that the guide bar 8 can easily be pushed into the inner bore 9 until the securing clips 12 are bent into the recess 11.

The exemplary embodiment according to FIGS. 5 and 6 permits particularly simple manufacture of the sliding bushing 6 according to the invention.

Here, the securing element 10 is composed of a continuous, approximately circular-arc-shaped securing clip which, in the position in which it has not yet been completely mounted—corresponding to the position illustrated by dot-dash lines—projects into the space defined by the inner bore 9, while in the secured position, illustrated as a continuous line in FIG. 5, it projects into the recess 11 as a convex bulge.

Since the sliding bushing 6 is composed of metal, the pressing of the securing element 10 into the recess 11 by the plastic deformation forms a permanent locked connection which extends over the entire service life of the sliding bushing 6.

The securing element 10 can be manufactured very easily, in particular in the case of the exemplary embodiment shown in FIG. 5. As is apparent in FIG. 6, a slit 14 is introduced into the wall of the sliding bushing 6 approximately in one of the two edge regions, and by means of the slit 14, the securing element 13 which is positioned between the slit 14 and the assigned end side of the sliding bushing 6 can be shaped without difficulty.

Depending on requirements, of course other shapes of the securing elements 10 are also possible, as are a multiplicity thereof, depending on the demands made of the sliding bushing 6 in terms of securing against axial and rotational movement.

In all cases, the recess 11 (pocket) in the bore of the brake caliper 2 is approximately matched in particular to the securing element 10 so that it is ensured that it is secured largely free of play in both possible directions of movement.

Table of Reference Numerals

1. Brake disc
2. Brake caliper
3. Brake carrier
4. Attachment element
5. Attachment element
6. Sliding bushing
7. Sliding bushing
8. Guide bar
9. Inner bore
10. Securing element
11. Recess
12. Securing clips

The invention claimed is:

1. A disc brake for use with a brake disc, comprising:
a caliper which extends over the brake disc and is attachable to a brake carrier so as to be axially displaceable with respect to the brake disc;
two attachment elements, one of said two attachment elements being a fixed bearing and another being a loose bearing having a sliding bushing, the sliding bushing being inserted into a bore in the caliper, the bore having an internal and/or external contour deviating from a circular shape;
a guide bar is guided in the sliding bushing;
wherein the sliding bushing of the loose bearing includes a securing element, the securing element being inserted into a recess of the bore such that it axially and rotationally secures the sliding bushing mounted in a precise position in the bore.

2. The disc brake of claim 1, wherein the securing element is composed of at least one securing clip, which is pressed into the recess as a component of the sliding bushing under plastic deformation.

3. The disc brake of claim 2, wherein the at least one securing clip has a convex outer contour when in a position of use.

4. The disc brake of claim 2, wherein the at least one securing clip includes two securing clips that are provided, which are each inserted into the recess when in the position of use.

5. The disc brake of claim 1, wherein in an out of use position, the securing element projects into an inner region of the bore, which region is defined by the cross section of an insertable guide bar.

6. The disc brake of claim 1, wherein in a position of use in which the securing element is inserted into the recess, the securing element lies outside the region defined by the cross section of the inserted guide bar.

7. The disc brake of claim 1, wherein the securing element is, after securement, connected integrally to the sliding bushing.

8. The disc brake of claim 1, wherein the securing element is inserted into the recess in a positively locking manner.

9. The disc brake of claim 8, wherein the sliding bushing is secured against axial and rotational movement by inserting the securing element into the recess.

10. The disc brake of claim 1, wherein in order to form the securing element, the sliding bushing has at least one slit extending in at least one of its two edge regions, and the securing element is manufactured by deforming the region between the at least one slit and a nearest outer end of the sliding bushing.

11. The disc brake of claim 1, wherein the securing element is arranged in the region of the wall of the sliding bushing which has the greatest cross-sectional dimension of the bore of the sliding bushing.

12. A bearing arrangement for a slideable disc brake having a caliper mountable on a carrier, the bearing arrangement comprising:
a fixed bearing;
a loose bearing, the loose bearing having a sliding bushing;
a bore formed in the caliper, the sliding bushing being inserted into the bore;
wherein at least one of an internal contour and external contour of the bore deviates from a circular shape and is provided with at least one recess;
the sliding bushing of the loose bearing including a securing element; and
wherein when the sliding bushing is mounted in a precisely positioned fashion in the bore, the securing element extends into the at least one recess of the bore so as to axially and rotationally secure the sliding bushing.

13. The disc brake of claim 12, wherein the securing element is a securing clip, which is pressed into the recess as a component of the sliding bushing under plastic deformation.

14. The disc brake of claim 13, wherein the securing clip has a convex outer contour when in a position of use.

15. The disc brake of claim 13, wherein the securing clip includes two securing clips that are provided, which are each inserted into the recess when in the position of use.

16. The disc brake of claim 12, wherein in an out of use position, the securing element projects into an inner region of the bore, which region is defined by the cross section of an insertable guide bar.

17. The disc brake of claim 12, wherein in a position of use in which the securing element is inserted into the recess, the securing element lies outside the region defined by the cross section of the inserted guide bar.

18. The disc brake of claim 12, wherein the securing element is inserted into the recess in a positively locking manner.

19. The disc brake of claim 12, wherein in order to form the securing element, the sliding bushing has at least one slit extending in at least one of its two edge regions, and the securing element is manufactured by deforming the region between the at least one slit and a nearest outer end of the sliding bushing.

* * * * *